(12) United States Patent
Tucker et al.

(10) Patent No.: US 10,817,597 B2
(45) Date of Patent: Oct. 27, 2020

(54) OPERATIONAL SCOPING WITH ACCESS RESTRICTIONS

(71) Applicant: ServiceNow, Inc., Santa Clara, CA (US)

(72) Inventors: Christopher Santford Tucker, San Diego, CA (US); Carl Solis, San Diego, CA (US); Derek Washington, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 69 days.

(21) Appl. No.: 15/492,661

(22) Filed: Apr. 20, 2017

(65) Prior Publication Data

US 2017/0308377 A1    Oct. 26, 2017

Related U.S. Application Data

(60) Provisional application No. 62/325,260, filed on Apr. 20, 2017.

(51) Int. Cl.
    *G06F 21/44*    (2013.01)
    *H04L 29/06*    (2006.01)
    (Continued)

(52) U.S. Cl.
    CPC .............. *G06F 21/44* (2013.01); *G06F 8/36* (2013.01); *G06F 9/44505* (2013.01);
    (Continued)

(58) Field of Classification Search
CPC ... G06F 21/44; G06F 8/36; G06F 8/70; G06F 9/44505; G06F 21/604; G06F 21/6218; G06F 17/30864; G06F 17/30867; G06F 2221/2101; G06F 67/22; H04L 63/101; H04L 63/102; H04L 63/20; H04L 63/10; H04L 63/22; H04L 67/22

See application file for complete search history.

(56) References Cited

U.S. PATENT DOCUMENTS 6,321,229 B1   11/2001  Goldman
6,678,887 B1   1/2004  Hallman
(Continued)

OTHER PUBLICATIONS

Android Developers, App Manifest/uses-permission, Apr. 17, 2017, developer.android.com, waybackmachine (Year: 2017).*
(Continued)

*Primary Examiner* — Michael Simitoski
(74) *Attorney, Agent, or Firm* — Fletcher Yoder PC

(57) ABSTRACT

A system and method for controlling access to a resource by an application are provided. The system includes a server that includes a memory and a processor. The memory includes instructions executable by the processor to execute the application by a development system configured to use one of a tracking mode and an enforcement mode. If the development system is configured to use the tracking mode, the system updates an access log for the resource responsive to the application accessing the resource, and creates an application manifest using the access log. The application manifest is configured for use in controlling access to the resource by the application executing on a production system.

13 Claims, 8 Drawing Sheets

(51) Int. Cl.
    G06F 9/445    (2018.01)
    G06F 21/62    (2013.01)
    G06F 8/36     (2018.01)
    G06F 21/60    (2013.01)
    G06F 21/50    (2013.01)
    H04L 29/08    (2006.01)

(52) U.S. Cl.
    CPC ........ *G06F 21/604* (2013.01); *G06F 21/6218* (2013.01); *H04L 63/101* (2013.01); *G06F 2221/2101* (2013.01); *H04L 67/22* (2013.01)

(56) References Cited

U.S. PATENT DOCUMENTS

| | | | |
|---|---|---|---|
| 7,020,706 B2 | 3/2006 | Cates | |
| 7,716,353 B2 | 5/2010 | Golovinsky | |
| 7,769,718 B2 | 8/2010 | Murley | |
| 7,925,981 B2 | 4/2011 | Pourheidari | |
| 8,151,261 B2 | 4/2012 | Sirota | |
| 8,239,954 B2* | 8/2012 | Wobber | H04L 63/101 726/26 |
| 8,402,127 B2 | 3/2013 | Solin | |
| 8,612,408 B2 | 12/2013 | Trinon | |
| 8,646,093 B2 | 2/2014 | Myers | |
| 8,832,652 B2 | 9/2014 | Mueller | |
| 8,918,834 B1* | 12/2014 | Samuelsson | H04L 63/20 726/1 |
| 9,065,783 B2 | 6/2015 | Ding | |
| 9,098,322 B2 | 8/2015 | Apte | |
| 9,122,552 B2 | 9/2015 | Whitney | |
| 9,213,850 B2* | 12/2015 | Barton | H04L 41/00 |
| 9,253,209 B2* | 2/2016 | Muppidi | H04L 63/20 |
| 9,317,327 B2 | 4/2016 | Apte | |
| 9,363,252 B2 | 6/2016 | Mueller | |
| 9,524,397 B1* | 12/2016 | Greenway | G06F 21/6227 |
| 9,535,737 B2 | 1/2017 | Joy | |
| 9,557,969 B2 | 1/2017 | Sharma | |
| 9,645,473 B2 | 5/2017 | Mueller | |
| 9,654,473 B2 | 5/2017 | Miller | |
| 9,766,935 B2 | 9/2017 | Kelkar | |
| 9,805,322 B2 | 10/2017 | Kelkar | |
| 10,122,757 B1* | 11/2018 | Kruse | H04L 63/10 |
| 2015/0067637 A1* | 3/2015 | Charfi | G06F 8/24 717/104 |
| 2015/0172320 A1* | 6/2015 | Colombo | H04L 63/20 726/1 |
| 2016/0335454 A1* | 11/2016 | Choe | G06Q 30/018 |
| 2017/0099292 A1* | 4/2017 | Kelley | H04L 63/10 |

OTHER PUBLICATIONS

William Stallings, Computer Security Principles and Practice, Jul. 18, 2014Pearson, 3rd Ed, 114-117 (Year: 2014).*

Wikipedia, "Deployment Descriptor", From Wikipedia, the free encyclopedia, Downloaded Mar. 21, 2016, http://en.wikipedia.org/wiki/Deployment_descriptor, 2 pp.

manageengine.com, 'Object Access Auditing Simplified—Find the 'Who, What, Where, When' of File & Folder Access, ManageEngine PitStop, ManageEngine Blogs, Posted by Joel Fernandes, EventLogAnalyzer, Downloaded Mar. 21, 2016, https://blogs.manageengine.com/it-security/eventloganalyzer/2012/06/20/object-access-auditing-simplified-find-the-who-what-where-when-of-file-folder-access.html, 12 pp.

google.com, "Understand data access", Google Apps Administrator Help, Downloaded Mar. 21, 2016, https://support.google.com/a/answer/176367?hl=en, 2 pp.

novell.com, "Using ACL-Based Authorization", Novell, User Management Guide, Chapter 4, Downloaded Mar. 21, 2016, https://www.novell.com/documentation/extend5/Docs/help/Director/books/usSecurityACL.html, 11 pp.

novell.com, "Using Security Roles", Novell, User Management Guide, Chapter 5, Downloaded Mar. 21, 2016, https://www.novell.com/documentation/extend5/Docs/help/Director/books/usSecurityRole.html#1075890, 5 pp.

* cited by examiner

OPERATIONAL SCOPING WITH ACCESS RESTRICTIONS

CROSS REFERENCE TO RELATED APPLICATIONS

The present application claims the benefit of U.S. Provisional Application No. 62/325,260, filed Apr. 20, 2016, the entire contents of which are hereby incorporated by reference in its entirety.

TECHNICAL FIELD

This disclosure relates in general to operational scoping with access restrictions.

BACKGROUND

Applications and the developers of applications under development can require access to external resources to run properly. External resources can reside in various locations including under the control of other applications.

SUMMARY

Disclosed herein are aspects of systems and methods for operational scoping with access restrictions.

In an implementation, a system for controlling access to a resource by an application is provided. The system includes a server that includes a server that comprises a memory and a processor. The memory includes instructions executable by the processor to: execute the application by a development system configured to use one of a tracking mode and an enforcement mode, if the development system is configured to use the tracking mode, to update an access log for the resource responsive to the application accessing the resource, and to create an application manifest using the access log. The application manifest is configured for use in controlling access to the resource by the application executing on a production system.

In another implementation, a method for controlling access to a resource by an application is provided. The method includes executing the application by a development system configured to use one of a tracking mode and an enforcement mode. If the development system is configured to use the tracking mode, the method includes updating an access log for the resource responsive to the application accessing the resource, and creating an application manifest using the access log. The application manifest is configured for use in controlling access to the resource by the application executing on a production system.

In another implementation, a non-transitory computer-readable storage medium for controlling access to a resource by an application is provided. The non-transitory computer-readable storage medium includes executable instructions that, when executed by a processor, facilitate performance of operations, including executing the application by a development system configured to use one of a tracking mode and an enforcement mode. If the development system is configured to use the tracking mode, the operations include updating an access log for the resource responsive to the application accessing the resource, and creating an application manifest using the access log. The application manifest is configured for use in controlling access to the resource by the application executing on a production system.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
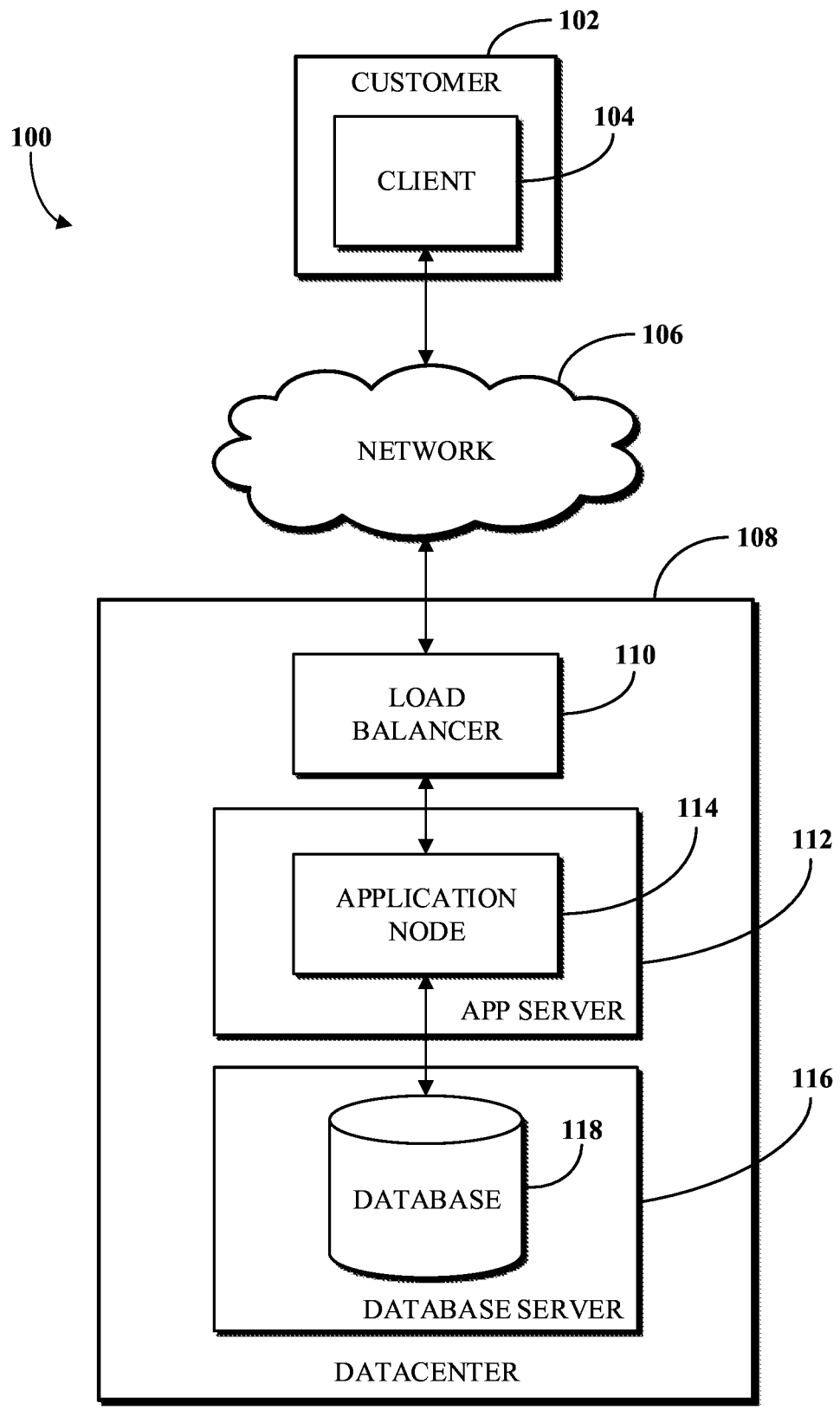
FIG. 1 is a block diagram of an example of an electronic computing and communications system.

Several applications can be available in a computing environment, such as a cloud environment operable by a service provider. The service provider can enable a customer to use an application node of the computing environment to operate the applications. The applications used by the customer can be applications provided by the service provider, the customer, or some other entity. For example, the application node can include a development environment which is used by application developers to develop the applications. An application operating in the application node can have resources under its control and/or can request access to external resources. External resources can be resources that are controlled by other applications operable in the computing environment, by the service provider, or by applications of the service provider.

Creating and deploying an application can involve multiple phases including a design phase (hereinafter design time), a test phase (hereinafter run time), and a production phase (hereinafter, also, run time). The design and test phases can be carried out in the development environment of the computing environment (e.g., in the application node). After development of the application is completed, the application can be run in a production environment. The production environment can be the same application node of the service provider or can be another application node in the same or another computing environment.

During the design phase, and in order to, for example, design and develop instructions of the application, application developers can require access to data or the application under development, via instructions, or can perform operations in other applications or modify data in other applications. However, the application developers may not be able to determine whether certain desired accesses are proper. For example, a developer may consider that access to a particular data field or table might be beneficial in a narrow instance, but the developer might not fully appreciate security implications of providing, for example, generalized access to the data field or table. Such accesses, therefore, may need to be limited (e.g., prevented), such as by an administrator, for security, performance, or other reasons.

Furthermore, it is desirable for administrators to be able to discover, when an application is installed, what resources the application will access, use, and/or change. Limits to this access needs to be tracked, exposed, and enforced without imposing an undue burden on the developer or administrator.

Implementations of the disclosure can include logging and controlling access to resources by software applications and application developers. Controls and restrictions can be implemented for design time (i.e., while the developer is developing the application and writing the instructions/code of the application), for run time data access (i.e., while the application is being tested, such as by the developer), or for run time application program interface (API) access.

For example, at design time, restrictions can be used to determine whether a developer can create an element of an application (e.g., metadata information) that interacts with a table or other data in another application. Such interactions may take the form of adding business rules, workflow, columns, UI components, etc. For example, at run time data access, restrictions can be used to determine whether the application or user can read/write/create/delete records in a table or other data in another application. For example, run time API restrictions can be used to determine whether the application can call (i.e., invoke) an API in another application or within the platform runtime. The computing environment, including the application node, of the provider environment is also referred to herein as platform, platform runtime, and framework.

At run time, a log is updated when an application requests access to an external resource. An application manifest, deployable with the application to a production environment, is created based on the log.

With regard to design time restriction, the design time restriction mechanism controls what a developer can build (and access) in the first place and how to determine what accesses to include during the development of an application.

Implementations of this disclosure provide technological improvements particular to computer networks, for example, those concerning operational scoping with access restrictions. Computer network-specific technological problems, such as controlling access by an application to resources, can be wholly or partially solved by implementations of this disclosure. For example, by preventing access to resources at design, by logging requests of an application to a resource at runtime and creating an application manifest of the access, the application manifest can be used in production to control access by the application to the resource. Implementations of this disclosure can thus introduce new and efficient improvements in the ways in which applications access resources by logging access requests in a development environment and using the logged accesses, via an application manifest, to enforce the access, such as, in production.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, the system 100 can include hundreds or thousands of customers, and at least some of the customers can include or be associated with any number of clients. A customer can include a customer network or domain. For example, the client 104 can be associated or communicate with a customer network or domain.

The system 100 can include a datacenter 108. The datacenter 108 can include one or more servers. For example, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as a database 118, which can be accessible by software executed on the application node 114. The database 118 may be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, systems and techniques for controlling an application access to resource. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
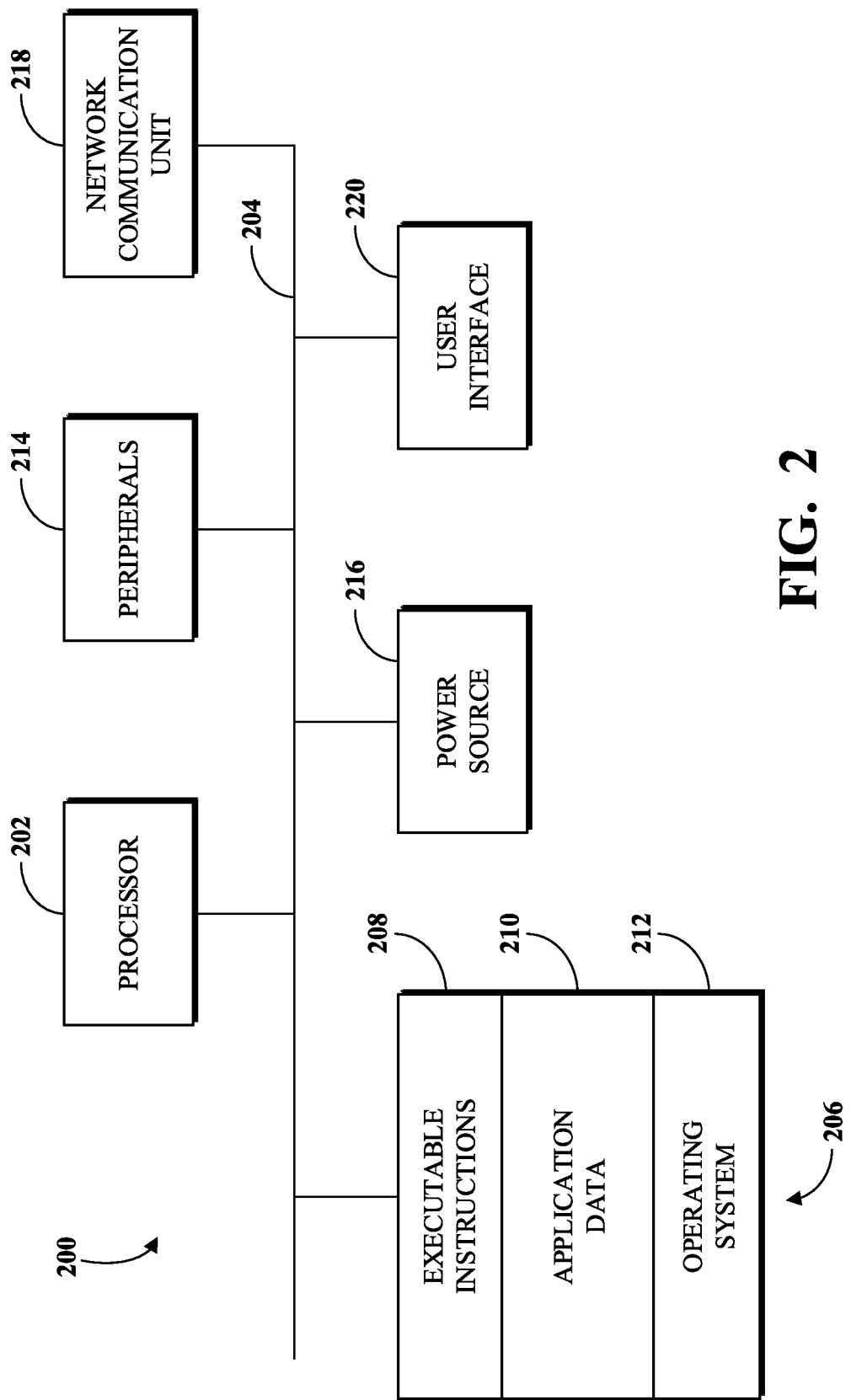
FIG. 2 is a block diagram of an example of an internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to control an application access to a resource.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3A:
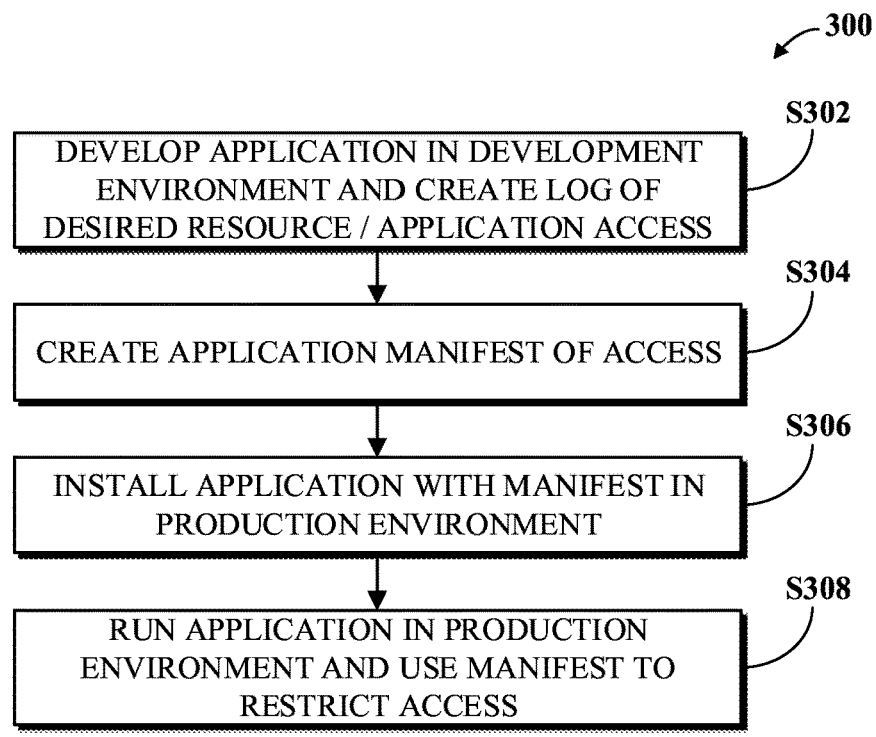
FIG. 3A is a flowchart of the development and execution of an application.

FIG. 3A is a flowchart 300 of the development and execution of an application. At operation S302, the application is developed and run (e.g., in test mode) in the development environment (i.e., when the application is executed by a development system). During the developing and running in the development environment, accesses (or desired accesses) by the application to various resources, including those of other applications, can be logged to a log, such as a log file, an access log, a database table, or the like. Once the log of accesses is available, at operation S304, an application manifest is created based on the log of accesses. The application manifest includes a list of accesses to external resources that the application initiates during execution. At operation S306, the application and the application manifest are installed or deployed in a production environment (i.e., when the application is executed by a production system). At operation S308, the application is run in the production environment and accesses by the application to external resources are controlled and are enforced based on the application manifest. The application manifest can be included as an integral part of an application bundle including the application. Alternatively, or in addition, the application manifest is provided externally to an application bundle such that a third party tool can interpret the application manifest. For example, the third party tool can be an application installer which can use the application manifest to determine the precise details of what accesses to external resources the installed application requires.

Figure 3B:
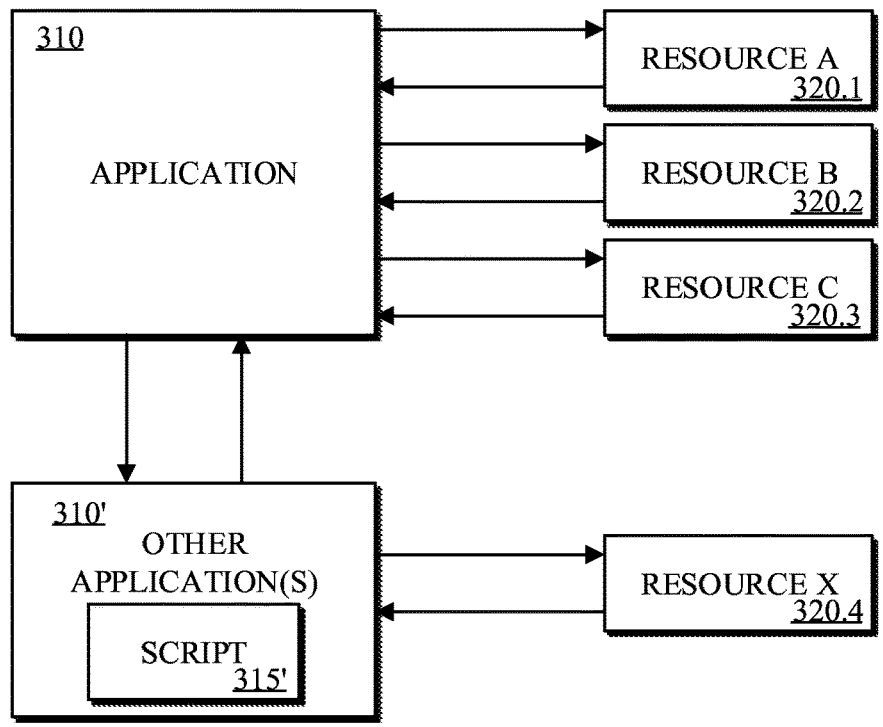
FIG. 3B is a block diagram of a system that controls access of an application to resources in a development environment using a tracking mode.
Figure 3C:
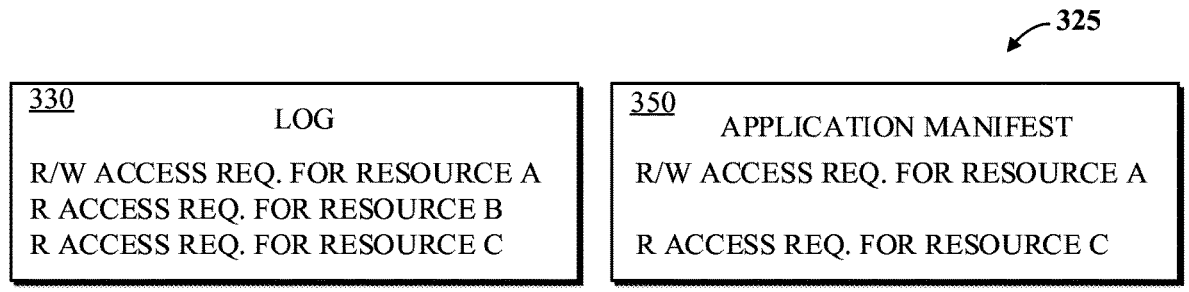
FIG. 3C is a block diagram of a system in the tracking mode that includes a log and an application manifest.
Figure 3D:
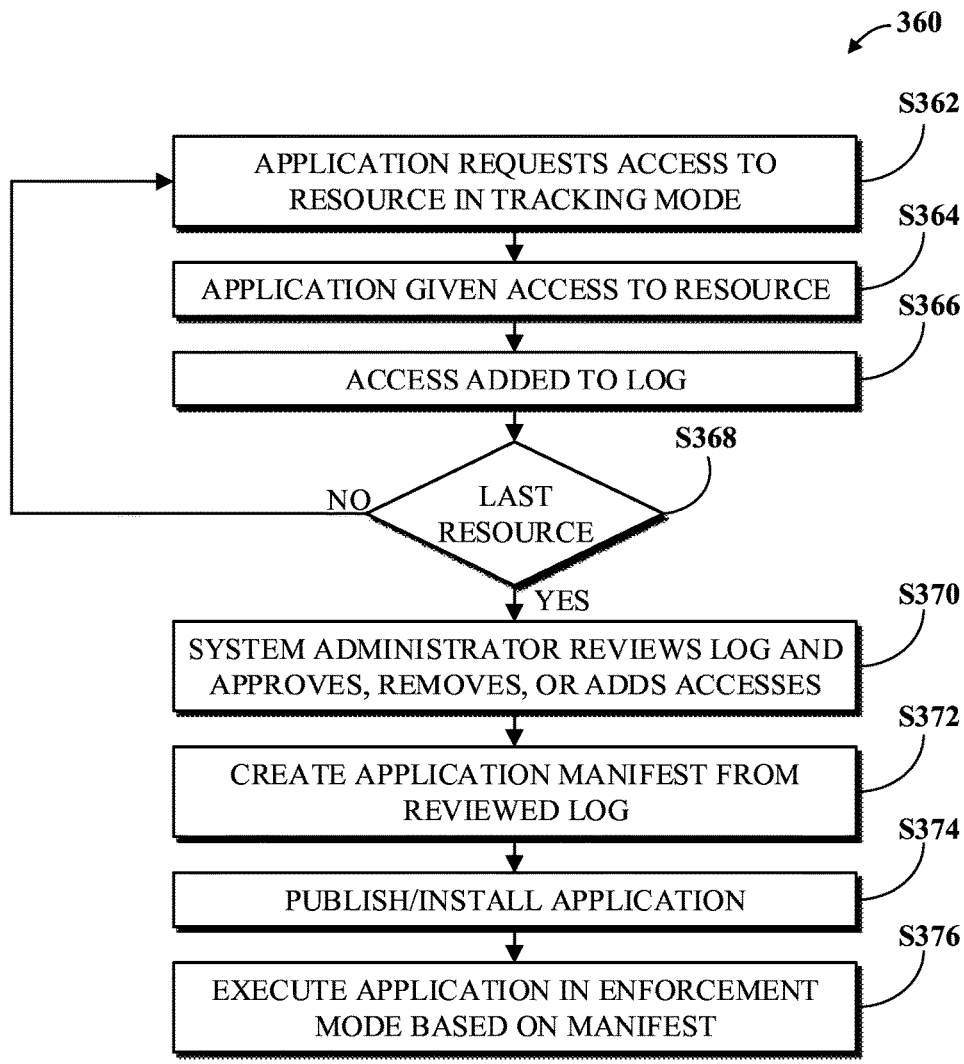
FIG. 3D is a flowchart of the operation of the tracking mode.

The operation S302 of the flowchart 300 can run the application in design time restriction mode (also, design-time control and design-time constraint) which is now described with reference to FIGS. 3B-3D. FIGS. 3B & 3C are block diagrams that illustrate application access to resources in a development environment using the tracking mode. FIG. 3D is a flowchart of the operation of the tracking mode.

FIG. 3B is a block diagram of a system 309 that controls access by an application to resources in a development environment using a tracking mode. The system 309 can be part of a service provider environment, such the system 100 of FIG. 1. The system 309 includes an application 310, resources 320.1, 320.2, 320.3, 320.4 (collectively, resources 320), at least one other application 310', and a script 315'. The resources 320 are controlled by the application 310'. The script 315' is executable by, within, or via the other application 310'. FIG. 3C is a block diagram of a system in the tracking mode that includes a log 330 and an application manifest 350.

The system 309 can control what visibility the application 310 has to the existence of the other applications 310' or to the resources 320 or to other resources. A configuration can be set in the system 309 or in the other application 310' to restrict visibility to or actions by the application 310 to any of the other application 310', the resources 320, the script 315', the other resources, any other applications, or any combination thereof.

For example, one of the resources 320 may be a table in a database. As such, the table can be made invisible to the application 310. The system 309, or the other application 310', can be configured to indicate to the application 310 that only three database tables of the other application 310' are visible (e.g., Resource A, Resource B, and Resource C indicated by resources 320.1, 320.2, and 320.3 respectively). As such, developers of the application 310 do not have the ability to see or access other resources (e.g., Resource X indicated by the resource 320.4 and the script 315') in the other application 310'.

Thus, a design-time constraint on what developers of the application 310 can access, coupled with additional run-time constraints, as described below, can provide a flexible model for controlling which applications can access what resources and when, and what an application can do with a resource it can access (e.g., read/write/delete/execute, etc.). This control, bundled together with the fact that information regarding the access of the application 310 to resources can be included in an application manifest (such as the application manifest 350 of FIG. 3C) and be enforceable when the application 310 executes in a production environment, can create a well-gated security and behavioral model around the application 310.

By way of example, if a developer of the application 310 is not, at design time, given a right to see an Incident database table (for example, Resource X indicated by the resource 320.4 can represent the Incident database table which can be controlled by the service provider or by the other application 310' that is controlled by the service provider), the developer of the application 310 cannot, e.g., attach a business rule defining the behavior of the application 310 or the other application 310' when records are inserted or updated in the Incident database table. This design-time constraint prevents developers from accessing the resource 320.4 via, for example, a user interface for configuring the resource with scripting or configuration activities that, for example, should not be permitted. From the point of view of the developer, the Incident database table does not appear to exist and, consequently, cannot be configured.

The operation S302 of the flowchart 300 can run the application in run-time restriction mode. An illustration of the run-time restriction in the development environment is provided with reference to FIG. 3B. If the application 310 depends on the other application 310' or the resource 320.4 of the other application 310', the developer of the application 310 can invoke the script 315' of the other application 310' or, alternatively or additionally, the developer can directly access data in the resource 320.4 of the other application 310'.

In existing solutions, this access can be less restricted which is undesirable. For example, if the other application 310' allows connections from other applications to obtain data from a particular table or run a script, there may not be granular controls on that access. That is, it may be case that if the other application 310' allows one requester application to access a resource of the other application 310', then all requester applications can access the resource. As such, according to implementations of this disclosure, access enforcement is carried out on the requester side.

In an implementation, a requirement may be added that any application (e.g., the application 310) wanting to access the resources 320 and associated data or to call the script 315' in the application 310', has to explicitly declare the desired access. For example, an application doing identity management would have to explicitly indicate an intention on reading from the resource 320.3 (e.g., reading data from a user table where all of the user information is stored). This intention is recorded in the application 310 as part of its application manifest 350. So when the application 310 is deployed out to a production system, and when it tries to access the resource 320.3, the resource 320.3 will verify that the application 310 asked for that access permission from the data in its application manifest 350. If the application 310 did not request this access, it is blocked from the access.

The application 310, running on the production system, can provide a list of desired accesses via the application manifest 350. A system administrator can decide whether to allow an access by the application 310 (i.e., whether the application 310 can be trusted to have or requires the requested access). For example, if an identity management application is being installed, there may be no problem allowing the identity management application to access and manipulate a user table. In contrast, if a non-user or non-identity management application, such as a module that integrates that email system of an external provider is being installed, it may be undesirable to allow the external provider to read and/or write to the user table.

By declaring in an application manifest file the accesses that an application requires and by preventing the application from doing more (i.e., gaining more access) than what is declared in the application manifest file, more confidence in the safety of deploying that application results. Combined with the above-described design time restrictions, this implementation allows for a better demarcation of the boundaries of the application 310's access to the resources 320 within the platform.

An application developer can develop the application 310 in the development environment (e.g., using a development system) in two selectable execution modes—a tracking mode, and an enforcement mode. As described below, the selected mode determines how much an administrator is to be involved in the day-to-day development of the application 310. The execution mode is selectable by a selection mechanism of the system 309.

FIGS. 3B-3D illustrate an implementation of a development environment in tracking mode. In the tracking mode, accesses by the running application in the development environment are tracked and recorded but allowed. By inspection of the log, the administrator can determine after the fact (i.e., after execution of the application 310) what accesses an application 310 made. FIGS. 3B-3D are further described below after reference is made to FIGS. 4A-4B.

Figure 4A:
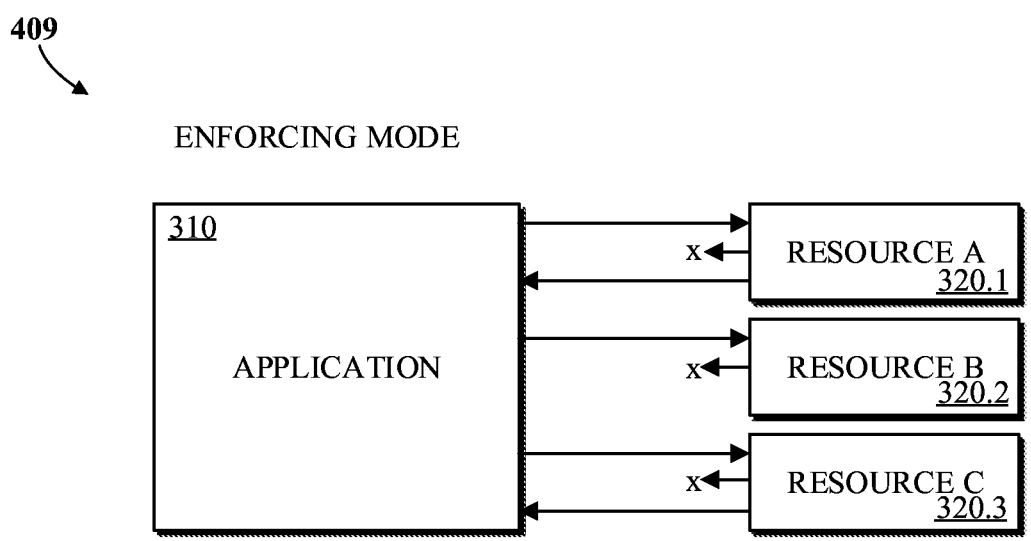
FIG. 4A is a block diagram of a system that controls access of an application to resources using an enforcement mode.
Figure 4B:
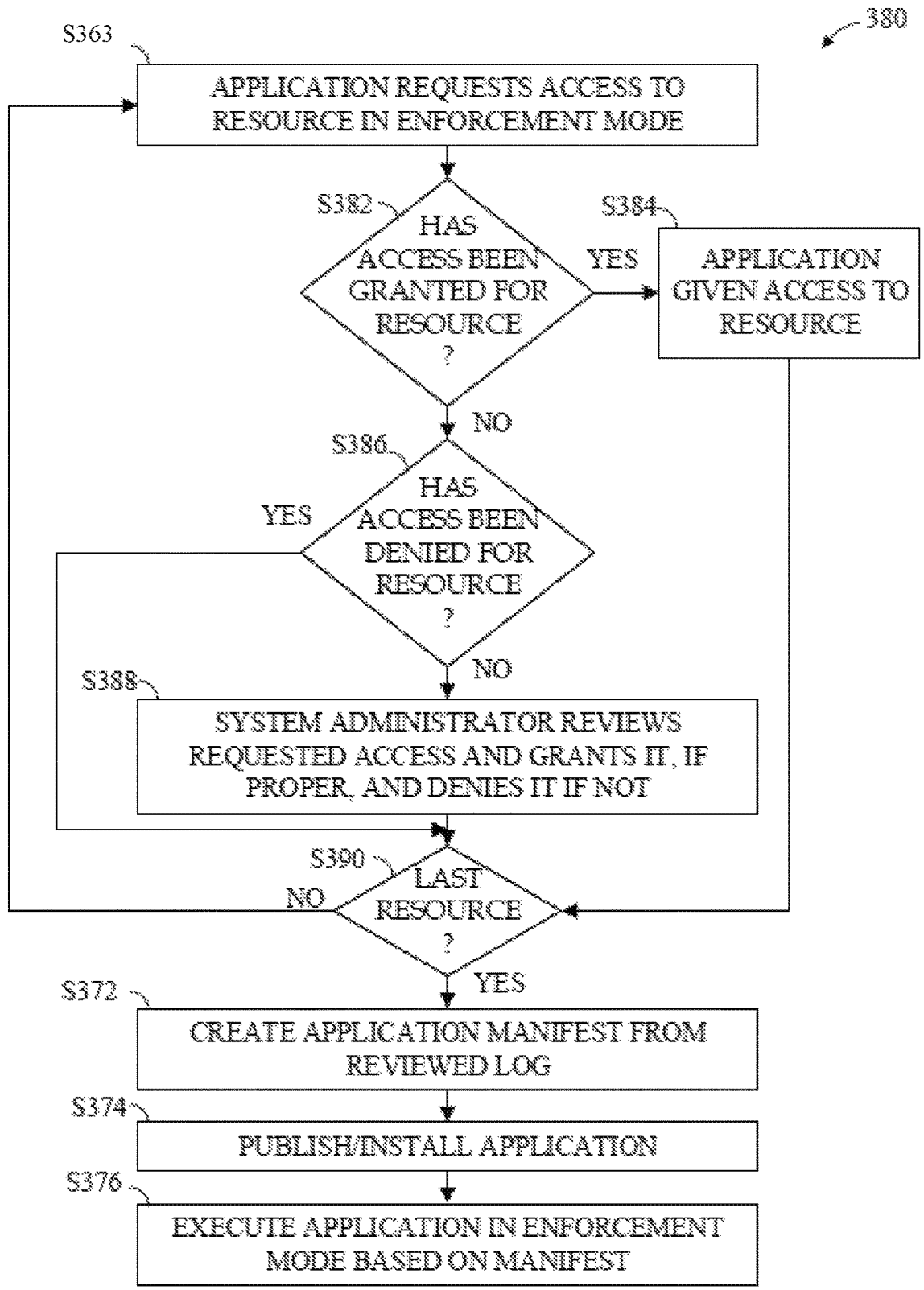
FIG. 4B is a flowchart of the operation of the enforcement mode.

FIG. 4A is a block diagram of a system 409 that controls access of an application to resources using an enforcement mode. The enforcement or enforcing mode development environment is where the administrator authorizes each access before the fact (i.e., before access is allowed). The enforcement mode can be enabled during development. FIG. 4B illustrates a process 400 of the operation of the enforcement mode. Like numerals and labels of FIGS. 4A and 4B refer to the same elements and descriptions as those of FIGS. 3B and 3D.

In an implementation, applications running in a production environment can be configured to always enforce the access rights declared in the application manifest 350, whether those rights came through implicit authorizations in the tracking mode or explicit authorizations in the enforcing (e.g., enforcement) mode. An enforcement module can be configured, for example by a system administrator, to specify different modes (tracking vs. enforcement) for different application developers. The configuration can be based on levels of trust or historical data based on need. For example, an application developer certified in the operation of the provider environment can be enabled in tracking mode while a non-certified application developer can be enabled in enforcement mode. The enforcement module can be configured to delegate the responsibility for authorizing requests to a third party, to an automated tool, or the like. The enforcement module can be enabled or disabled, such as by the administrator, on a per-application or per-instance basis, giving the administrator full flexibility to determine the desired levels of control.

For the tracking mode, and referring back to FIG. 3B, an executable application, which may be, or may be derived from, the application 310 is built for testing (e.g., a debugging version) in the development environment. During its execution, a tracking mechanism dynamically monitors the executable application to identify the calls (i.e., requests) made by the executable application to the other applications 310' or the resources 320. As used herein, "resources" can include other applications. In the tracking mode, the calls are allowed, but the log 330 of FIG. 3C is written out to, for example, a table or otherwise recorded.

An executable application can include any set of files that can be used to cause the execution of a series of instructions. An executable application can include an application that is compiled into binary form, an application that includes instructions in an interpreted scripting language, or an application that includes a collection of database entries or other entries that can be processed by the platform or framework software to achieve a desired output. In an implementation, an application can include one or more configuration values stored in a database, one or more definitions of data structures (e.g., tables and/or table columns) for storing data, and one or more scripts for executing commands exposed by a platform and framework. Such an application can be executed by the platform and framework by processing and interpreting the information associated with the application.

Access to resources can be controlled by an access enforcement module or the system administrator in the enforcement mode, the tracking mode, or both. An access enforcement module can be implemented in a development environment, a production environment, or both. The access enforcement module, for example, can be configured to permit accesses in a tracking mode and to restrict accesses in an enforcement mode. In an implementation, the access enforcement module can be configured to permit or restrict access according to some or all of the steps described herein.

In FIGS. 3B-3D, Resources A and C are those for which access (i.e., which can be different types of access such as both read/write or only read) is granted/authorized, and Resource B is one for which access is denied/unauthorized as denoted in the application manifest 350. Referring collectively to FIGS. 3B-3D, in process 360, at operation S362, the application 310 requests an access to a resource in tracking mode, such as R/W access to the Resource A 320.1. At operation S364, access to the Resource A 320.1 is given, and, at operation S366, the request is added to the log 330. At operation S368, if this is not the last resource for which access is sought, the process 360 returns to S362, otherwise the process 360 proceeds to the operation S370.

Assuming next that read access to the Resource B 320.2 is requested, the request is allowed and added to the log 330 as "R ACCESS REQ. FOR RESOURCE B." Access is provided even though, as described below, the Resource B is ultimately an unauthorized resource. The process is repeated for read access request to the Resource C 320.3. The request is given at the operation S364 and an entry "R ACCESS REQ. FOR RESOURCE C" is added at operation S366 to the log 330. While in this example, only read and write access requests are depicted, other access types of requests can be logged. For example, create, delete, and execute access requests can be logged.

When no more accesses to resources are requested, the process 360 moves to the operation S370. When the process 360 is at the operation S370, the log 330 provides a list of the accesses that the application 310 requested. Other examples that can be included in the log 330, include, but are not limited to, "READ access to global.sys_user table" and "EXECUTE access to util.StringUtils scripts." At the operation S370, the system administrator can review the log 330 and remove/filter entries considered to be invalid/improper. The administrator can add entries considered to be missed by applying a filter. For example, although the requested access to Resource B 320.2 was granted, the system administrator, upon determining that such an access is unauthorized, chooses not to include the entry in the application manifest 350. At operation S372, the application manifest 350 is created from the log 330. A filter can be applied to the log 330 to create the application manifest 350.

For example, an administrator can base the filtering on a set of predefined or predetermined access rules. At operation S374, the application 310 is packaged published or installed, such as by a publishing module of the provider environment. When the application 310 is published, the needed accesses become part of the application manifest 350. The application manifest 350 can be generated in multiple formats as part of the packaging process. For example, the application manifest 350 can be provided in a form structured to facilitate enforcement by an enforcement module and optimized for use by the enforcement module. The application manifest 350 can also be provided in an externally-readable form optimized for processing by third parties (e.g., as JSON) for interpretation and presentation by those third parties. The publication or installation of the executable application in the production environment/instance can also be accomplished by transmitting the executable application via a network connecting the development and production environments/instances. At operation S376, when the application is executed in the production environment/instance, the accesses in the application manifest 350 are enforced.

In the enforcement mode, distinguished from the tracking mode, in the development environment illustrated by FIGS. 4A and 4B, an enforcing mechanism, such as the enforcement module, may prohibit initial access by default (however, initial access may be permitted, for example, to a predefined access list that defines, e.g., resources that may be accessed, including a set of applications, scripts, and other resources). When the application 310 tries to access a resource, in contrast to allowing the access to go through, as was done in the tracking mode discussed above, the enforcing mechanism can block the access, but then can, for example, queue a request for the system administrator or other enforcing entity (use of "system administrator" below includes any enforcing entity) to approve the attempted access.

For example, and referring to the process 400 of FIG. 4B, the application 310, at the operation S363 attempts to access the Resource A 320.1 as described with respect to FIG. 3B. If the application has been previously granted access to the resource (i.e., "YES" at operation S402), then the application 310 is given access to the resource at operation S404 and the process 400 continues to operation S410. However, if this is the first attempt to access the resource (in which case, access would not have been granted or denied), the attempt is initially blocked, and the attempt is logged. In more detail, if the application 310 has not been granted access to the resource (i.e., "NO" at the operation S402), then at operation S406, the process 400 determines whether the access has been previously denied for the resource. A request can be previously denied when the application 310 makes an improper earlier attempt to access the same resource.

If access has been denied (i.e., "YES" at the operation S406), then the process 400 proceeds to the operation S410 and the application 310 is not granted the access. However, if the access has not been denied (i.e., "NO" at the operation S406), then this indicates that a previous request for access has not been made, and at operation S408, the system administrator reviews the requested access and grants the request if the request is proper and denies it otherwise.

Assuming the same requests as those depicted in the log 330 of FIG. 3C, the process 400 proceeds as follows. The system administrator reviews the access request and determines it is an authorized request, and thus grants permission so that the application 310 can access the Resource A 320.1. The process 400 repeats the operations S363-S410 of the process 400 for the Resource B 320.2. The application 310 attempts to access the Resource B 320.2. This attempt is initially blocked, and the attempt is logged. At the operation S408, the system administrator reviews the access request and determines it is an unauthorized request, and thus does not grant permission for the application to access Resource B. The process 400 repeats the operations S363-S410 for the Resource C 320.3. The application 310 attempts to access the Resource C 320.3. This attempt is initially blocked, and the attempt is logged. At the operation S408, the system administrator reviews the access request and determines it is an authorized request, and thus grants permission so that the application 310 can access the Resource A 320.1.

When the last resource has been requested ("YES" at the operation S410), e.g., the application is finished running in the development environment, the operations proceed as described above. The process 400 includes similar operations to the process 300, specifically the operations S372, S374, and S376. At the operation S372, the system administrator creates the application manifest 350 from the log 330 and base its filtering on a set of predefined access rules. At the operation S374, when the application 310 is published out and packaged up for the production environment, the needed accesses becomes part of the application manifest 350. At the operation S376, when the application 310 is executed in the production environment/instance, the accesses in the application manifest are enforced. Execute accesses may be enforced against both applications (software provided by third parties or provided by the service provider on top of the) and against the platform runtime (i.e., the platform itself). This permits, e.g., controlling access to potentially harmful platform APIs (e.g., enqueuing events) as well as preventing access to third party script (e.g., global.StringUtils).

The system administrator can mark the record access as allowable or not allowable by, e.g., editing a permitted access field value in an enforcement log table of the log 330. The system administrator could choose to automate some or all of this process using platform tooling (e.g., business rules to automatically grant access to particular APIs/tables/etc., while rejecting others). This process may be iterated many times until all of the needed (or permissible) accesses are allowed by the system administrator. Because the log of access may be recorded in a simple table, it is also possible to pre-declare intended accesses in order to reduce the number of iterations. Such pre-declared intended accesses could be created in sets for accesses that are commonly requested together or utilize similar resources. Furthermore, in an implementation, information may be shared between the design time restrictions and run time restrictions. The system can be intelligent about what accesses an application needs and does not need, which can possibly alleviate some of the burden on the system administrator. The process 400 of FIG. 4B also suggests that each initial requested access (that has not been granted or denied) is considered by the system administrator before moving on. However, multiple accesses can be requested and denied prior to review by the system administrator for the sake of efficiency. This functions as long as a subsequently requested resource does not rely upon a previously requested resource.

This system may also be used to provide a third tier of access control by third parties. For example, the third parties can allow: 1) no access to their data/script; 2) access to their data/script by anyone; or 3) access only to applications that explicitly declare that access. Such a third tier can exercise control over access by third parties such that if an entity (e.g., a third-party application) is going to access sensitive data (e.g., perform identity management functions) it can be required to pre-declare that access (e.g., such that the access can be, by extension, approved of by the installing administrator or similar entity).

Figure 5:
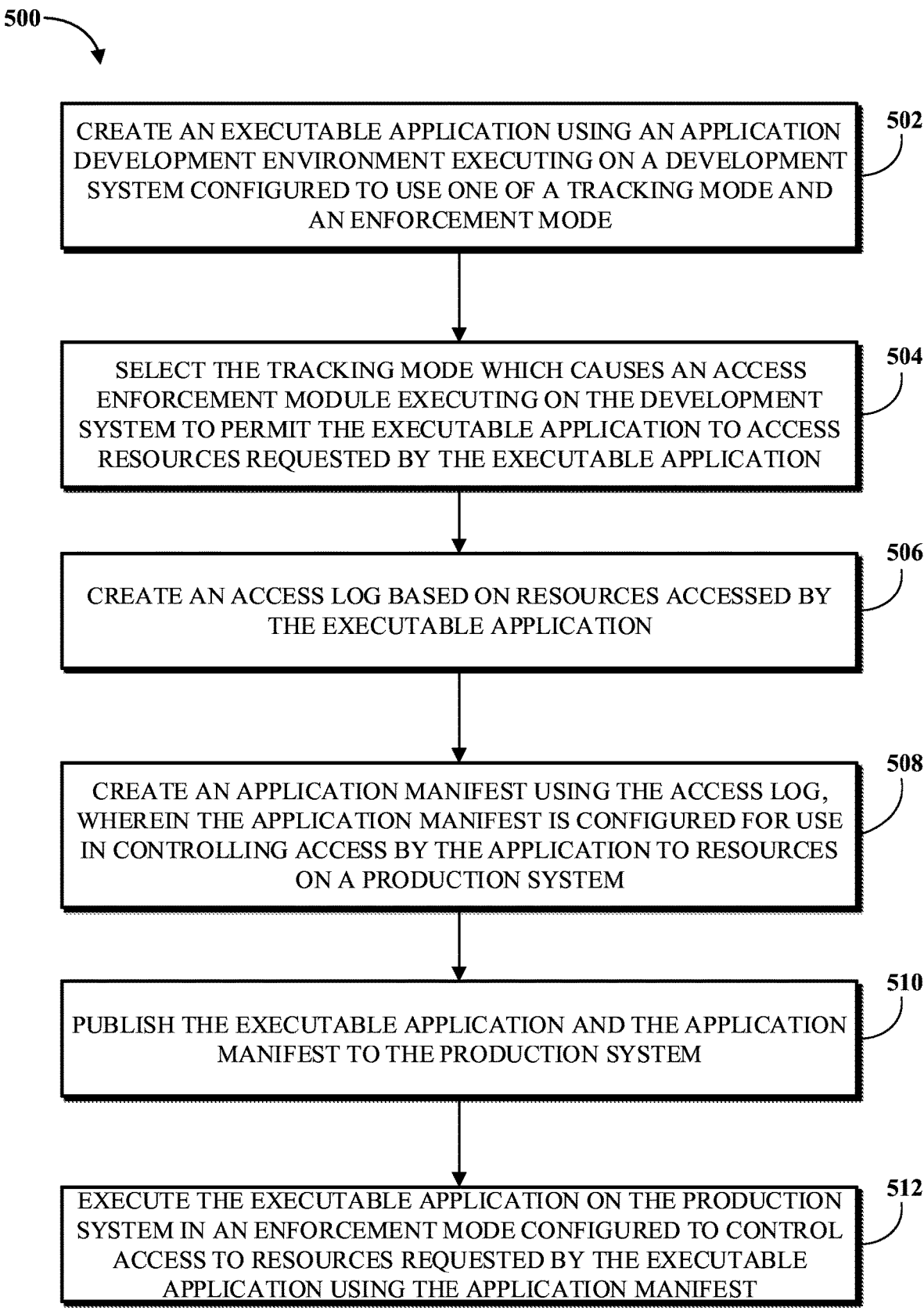
FIG. 5 is an example of a technique for controlling an application access to a resource.

FIG. 5 is an example of a technique 500 for controlling an application access to a resource. The technique 500 includes steps 502-512. At step 502, an executable application using an application development environment is created. The application development environment executes on a development system such as that is part of an application node, such as the application node 114 of FIG. 1. The development system can be configured to use one of a tracking mode and an enforcement mode. At step 504, selects the tracking mode is selected. Selecting the tracking mode causes an access enforcement module executing on the development system to permit the executable application to access resources requested by the executable application.

At step 506, an access log based on resources accessed by the executable application is created. At step 508, an application manifest using the access log is created. The application manifest is configured for use in controlling access by the application to resources on a production system. At step 510, the executable application and the application manifest is published to the production system comprising a processor, memory and network interface using a network connection between the network interfaces of the development system and the production system. At step 512, the executable application is executed on the production system in an enforcement mode configured to control access to resources requested by the executable application using the application manifest.

Figure 6:
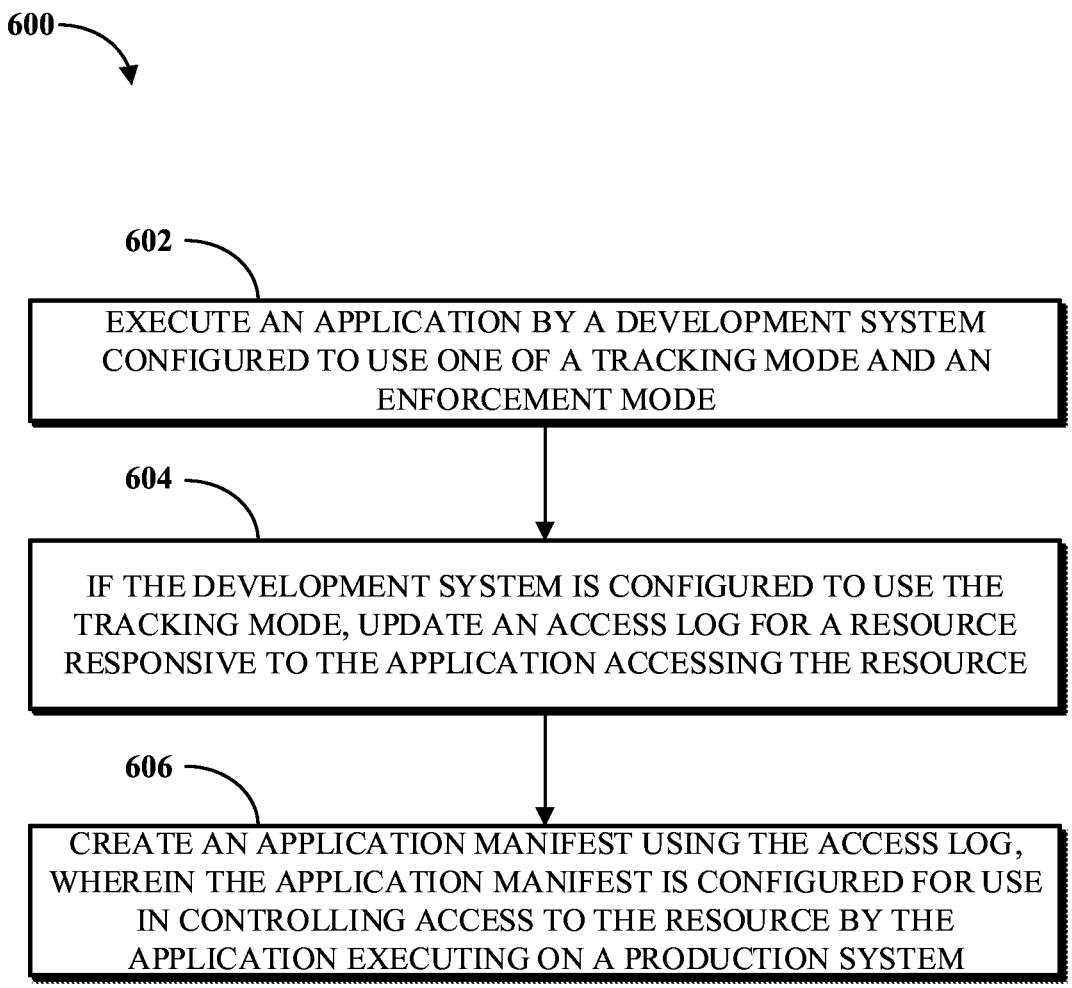
FIG. 6 illustrates a method for controlling an application access to a resource.

FIG. 6 illustrates a method 600 for controlling an application access to a resource. The method 600 includes executing an application by a development system configured to use one of a tracking mode and an enforcement mode, via step 602. The method 600 also includes, if the development system is configured to use the tracking mode, updating an access log for a resource responsive to the application accessing the resource, via step 604. The method 600 also includes creating an application manifest using the access log, via step 606. The application manifest is configured for use in controlling access to the resource by the application executing on a production system. The resource can be one of a database table, a database record, an executable script, and another executable application. The access can be one of read access, write access, execute access, and delete access.

In an implementation, the method 600 can include, in response to the application executing on the production system requesting access to a resource, granting access to the resource based on the application manifest when the application is configured to be executed on the production system in an enforcement mode.

In an implementation, the method 600 can also include, if the development system configured to use the enforcement mode, generating a request to access the resource and updating the access log for a resource based on a response to the request. The response to the request can be response to grant the request or a response to deny the request. The response can be provided by an operator, such as a system administrator.

In an implementation, the development system can be configured with a design-time control that blocks visibility of the resource to an application developer of the application. The method 600 can also include preventing, by the development system, access to another resource by the application in development mode. The technique 600 can also include pre-declaring intended accesses by the application in the access log.

The technique 500 and the method 600 can be implemented by an application node (similar to the application node 114 of FIG. 1). The technique 500 and the method 600 can be executed using computing devices, such as the systems, modules, and devices described with respect to FIGS. 1-2. The technique 500 and the method 600 can be performed, for example, by executing machine-readable programs or other computer-executable instructions, such as instructions or programs described according to JavaScript, C, or other such instructions. The steps, or operations, of the technique 500, the method 600 or any other technique, method, process, or algorithm described in connection with the implementations disclosed herein can be implemented directly in hardware, firmware, software executed by hardware, circuitry, or a combination thereof.

Although the technique 500 and the method 600 are shown as a series of operations for clarity, implementations of the technique 500, the method 600 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

Another implementation of this disclosure is a system for controlling an application access to a resource. The system includes a means for executing an application by a development system configured to use one of a tracking mode and an enforcement mode, a means for updating an access log for a resource responsive to the application accessing the resource if the development system is configured to use the tracking mode, a means for creating an application manifest using the access log. The application manifest is configured for use in controlling access to resources by the application executing on a production system All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/ processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical."

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for controlling access to a plurality of resources by an application, comprising:
   a server including a memory and a processor, wherein the memory includes instructions executable by the processor to:
   execute the application by a development system in a tracking mode and an enforcement mode at different times;
   for each resource of the plurality of resources the application attempts to access during execution of the application by the development system in the tracking mode, update an access log with the resource responsive to the application accessing the resource;
   for each resource of the plurality of resources the application attempts to access during execution of the application by the development system in the enforcement mode:
   send a request to access the resource to an enforcing entity responsive to the application attempting to access the resource;

update the access log with the resource responsive to the request to access the resource being granted or denied by the enforcing entity; and permit access to the resource by the application responsive to the request to access the resource being granted;

create an application manifest based on the access log, wherein a production system is configured to provide the application with access to one or more resources of the plurality of resources, or to deny the application access to the one or more resources, based on the application manifest; and for each resource of the plurality of resources the application attempts to access during execution of the application by the production system, control access to the resource by the application based on the application manifest.

2. The system of claim 1, comprising:
a design-time control that blocks visibility of the one or more resources to an application developer of the application.

3. The system of claim 1, wherein the one or more resources comprises a database table, a database record, an executable script, or another executable application, or any combination thereof.

4. The system of claim 1, wherein the access comprises read access, write access, execute access, or delete access, or any combination thereof.

5. The system of claim 1, wherein the memory includes instructions executable by the processor to:
pre-declare intended accesses by the application in the access log.

6. A method for controlling access to a plurality of resources by an application, comprising:
executing the application by a development system in a tracking mode and an enforcement mode at different times;

for each resource of the plurality of resources the application attempts to access during execution of the application by the development system in the tracking mode, updating an access log with the resource responsive to the application accessing the resource;

for each resource of the plurality of resources the application attempts to access during execution of the application by the development system in the enforcement mode:
sending a request to access the resource to an enforcing entity responsive to the application attempting to access the resource;
updating the access log with the resource responsive to the request to access the resource being granted or denied by the enforcing entity; and
permitting access to the resource by the application responsive to the request to access the resource being granted;

creating an application manifest based on the access log, wherein a production system is configured to provide the application with access to one or more resources of the plurality of resources, or to deny the application access to the one or more resources, based on the application manifest; and for each resource of the plurality of resources the application attempts to access during execution of the application by the production system, controlling access to the resource by the application based on the application manifest.

7. The method of claim 6, wherein the development system is configured with a design-time control that blocks visibility of the one or more resources to an application developer of the application.

8. The method of claim 6, wherein the one or more resources comprises a database table, a database record, an executable script, or another executable application, or any combination thereof.

9. The method of claim 6, wherein the access comprises read access, write access, execute access, or delete access, or any combination thereof.

10. The method of claim 6, comprising:
pre-declaring intended accesses by the application in the access log.

11. A non-transitory computer-readable storage medium for controlling access to a plurality of resources by an application, wherein the non-transitory computer-readable storage medium includes executable instructions that, when executed by a processor, facilitate performance of operations, comprising:
executing the application by a development system in a tracking mode and an enforcement mode at different times;

for each resource of the plurality of resources the application attempts to access during execution of the application by the development system in the tracking mode, updating an access log with the resource responsive to the application accessing the resource;

for each resource of the plurality of resources the application attempts to access during execution of the application by the development system in the enforcement mode:
sending a request to access the resource to an enforcing entity responsive to the application attempting to access the resource;
updating the access log with the resource responsive to the request to access the resource being granted or denied by the enforcing entity; and
permitting access to the resource by the application responsive to the request to access the resource being granted;

creating an application manifest based on the access log, wherein a production system is configured to provide the application with access to one or more resources of the plurality of resources, or to deny the application access to the one or more resources, based on the application manifest; and for each resource of the plurality of resources the application attempts to access during execution of the application by the production system, controlling access to the resource by the application based on the application manifest.

12. The non-transitory computer-readable storage medium of claim 11, wherein the development system is configured with a design-time control that blocks visibility of the one or more resources to an application developer of the application.

13. The non-transitory computer-readable storage medium of claim 11, wherein the operations comprise:
pre-declaring intended accesses by the application in the access log.

* * * * *